UNITED STATES PATENT OFFICE.

KARL OTTO KRETSCHMER, OF ELIZABETH, NEW JERSEY, ASSIGNOR OF TWO-THIRDS TO CHARLES J. CANDA AND FERDINAND E. CANDA, OF NEW YORK, N. Y.

PROCESS OF REFINING METALS.

No. 898,116.     Specification of Letters Patent.     Patented Sept. 8, 1908.

Application filed October 18, 1907. Serial No. 398,005.

*To all whom it may concern:*

Be it known that I, KARL OTTO KRETSCHMER, citizen of the United States, residing at Elizabeth, New Jersey, have invented certain new and useful Improvements in Processes of Refining Metals; and I do hereby declare the following to be a full, clear, and exact description of the invention, such as will enable others skilled in the art to which it appertains to make and use the same.

My invention relates to an improved process of refining metals and in particular to the refining of steel during the process of manufacturing the same.

The object of my invention is to provide a composition or flux which will free the molten steel from oxids and also from particles of slag suspended in it.

It is well known that one great difficulty hitherto encountered in the manufacture of steel has been to remove the oxids and slag so as to form a homogeneous product. The molten steel running from the furnace to the ladle carries impurities intimately commingled with it and the amount of such impurities is increased by contact of the metal with the air. It has been common to add various ingredients to the molten metal to serve as fluxes, for the purpose of causing the impurities to rise to the top of the molten metal, whereby the metal in a refined condition can be separated from the impurities which accumulate as slag. While the ingredients heretofore employed as fluxes have been of advantage in refining the steel, they are not entirely satisfactory in practice in attaining the desired result, probably owing to the fact that they do not disseminate with sufficient rapidity through the molten steel to allow them to come into contact and react with the impurities in the short time permissible for the treatment.

I have discovered that if anhydrous or even partly dehydrated compounds of boron and in particular anhydrous boron-trioxid, $B_2O_3$, be used as a flux, they have marked advantages in practice over anything hitherto known to me. Such a flux will distribute itself rapidly through the molten steel and is exceedingly active in combining with the metallic oxids in the molten steel to form chemical compounds constituting a thin fluid flux which rises rapidly to the top of the molten metal and there accumulates as a layer impenetrable to the air, thus serving to protect the liquid metal below. Furthermore, the rapidly rising thin fluid flux incloses and carries along the particles of slag which may be disseminated through the molten metal, thus quickly refining the metal and leaving it in an excellent homogeneous condition.

In order to obtain the desired anhydrous or partly dehydrated compounds of boron and their combination with other chemical compounds, I may subject boric acid or borates of any kind to high temperatures in order to drive off the water of crystallization and also the water of its chemical constitution. For example, upon subjecting boric acid to a temperature of about 160° C., the same is partly and at fusion say 600° C. completely dehydrated according to the length of the treatment. The resultant product, either completely or partly dehydrated boric acid is particularly adapted for my purpose. The completely dehydrated product is known as boron-trioxid, $B_2O_3$, and gives the best results, although the partly dehydrated boric acid is capable of satisfactory action for the purpose intended.

By submitting borates of any kind, for example, biborate of soda, $(Na_2B_4O_7 + 10H_2O)$ to a high temperature, for example, about 150° C., the anhydrous borate may be obtained and these act well in carrying out my process. Furthermore, a mixture of these various dehydrated compounds of boron may be used, if desired, with good results. While the proportion of such dehydrated compounds of boron which are added to the molten metal may vary according to the composition and amount of impurities in the molten metal, I have found that the addition of the boron trioxid in the proportion of 2 pounds to each ton of molten steel or thereabout, gives satisfactory results. When the anhydrous borates are employed they should be added in the proportions of about 4 pounds to each ton of molten steel.

In carrying out my process, I add the flux or fluxes hereinbefore specified to the ladle while the same is being charged from the furnace, or I may add the said flux or fluxes to the metal while it is flowing through the trough from the furnace to the ladle.

I am aware that it may be difficult and therefore perhaps commercially impracticable to obtain the compounds of boron in an absolutely dehydrated or anhydrous condition, but a sufficiently close approach to this desirable condition is readily obtained in practice, and, therefore, it is to be understood that by the use of the terms anhydrous or dehydrated in the claims, I mean substantially anhydrous and substantially dehydrated, thus including those conditions where the compound employed is only partly dehydrated or partly anhydrous, yet sufficiently free from water to accomplish the desired advantageous results. By the treatment of the desired compounds to remove the water of constitution and crystallization or the major portion thereof prior to introducing it into the molten steel, I obtain practical results in the refining of metals, for if the compounds be introduced into the molten metal without such prior treatment the amount of water contained in a charge of the necessary size is great enough, when converted into steam, to cause an explosion which would scatter some of the molten metal in every direction, and leave the remaining metal in a porous condition. These serious disadvantages are entirely avoided by my invention.

Having thus fully described my invention, what I claim is:

1. The process of refining metals, which consists in subjecting the metal while in a molten condition to the action of previously dehydrated compounds of boron.

2. The process of refining metals, which consists in adding a previously dehydrated compound of boron to the molten metal after said metal has left the furnace.

3. The process of refining metals, which consists in adding an anhydrous compound of boron to the molten metal while charging said metal into the ladle.

4. The process of refining metals, which consists in subjecting the metal while in a molten condition to the action of previously dehydrated compounds of boric acid.

5. The process of refining metals, which consists in adding a dehydrated borate to the molten metal while charging said metal into the ladle.

6. The process of refining metals, which consists in adding a dehydrated borate to the molten metal after said metal has left the furnace.

In testimony whereof I hereunto affix my signature in the presence of two witnesses.

KARL OTTO KRETSCHMER.

Witnesses:
RUSSELL MILES,
T. J. JONES.